Patented Feb. 14, 1933

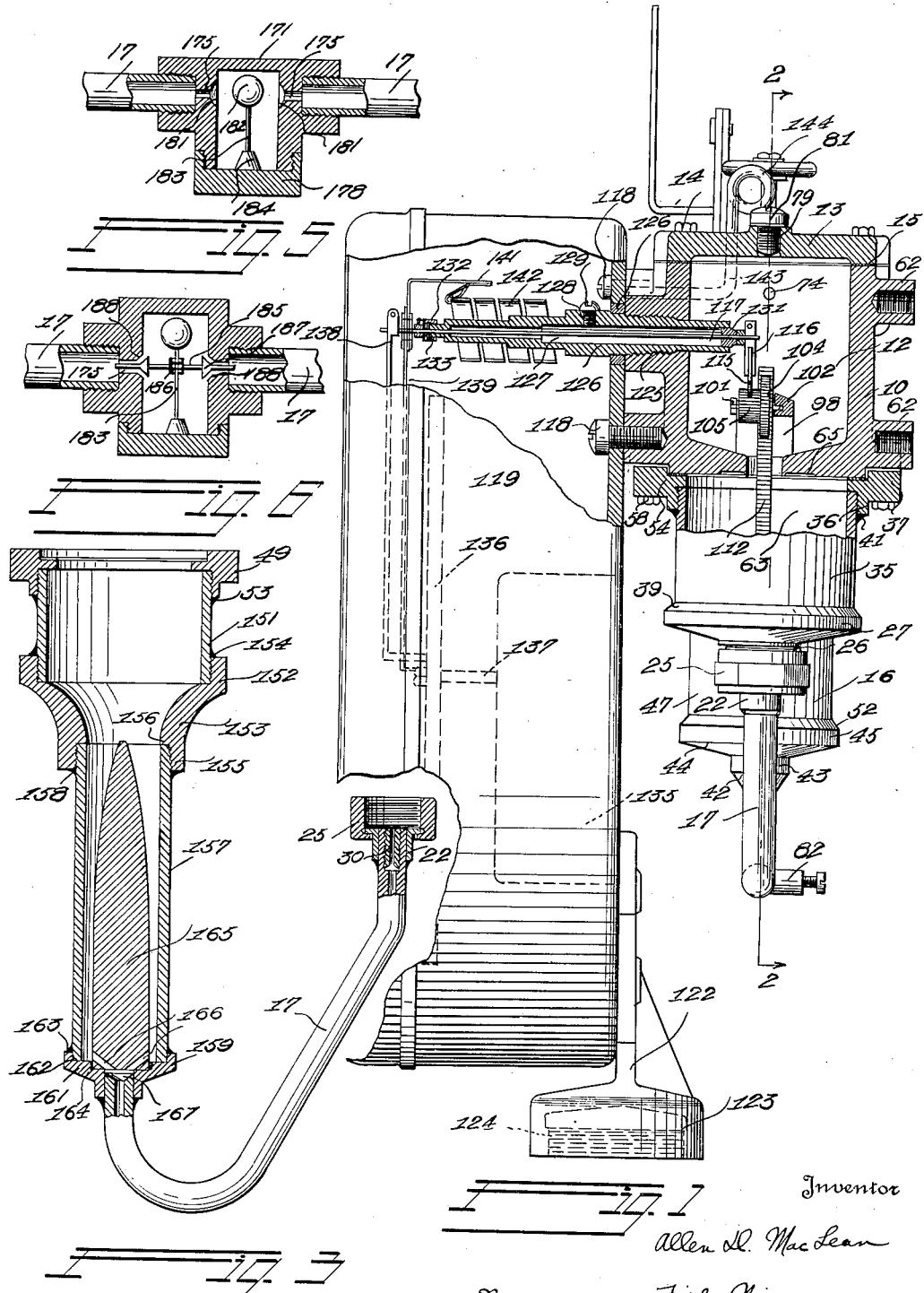

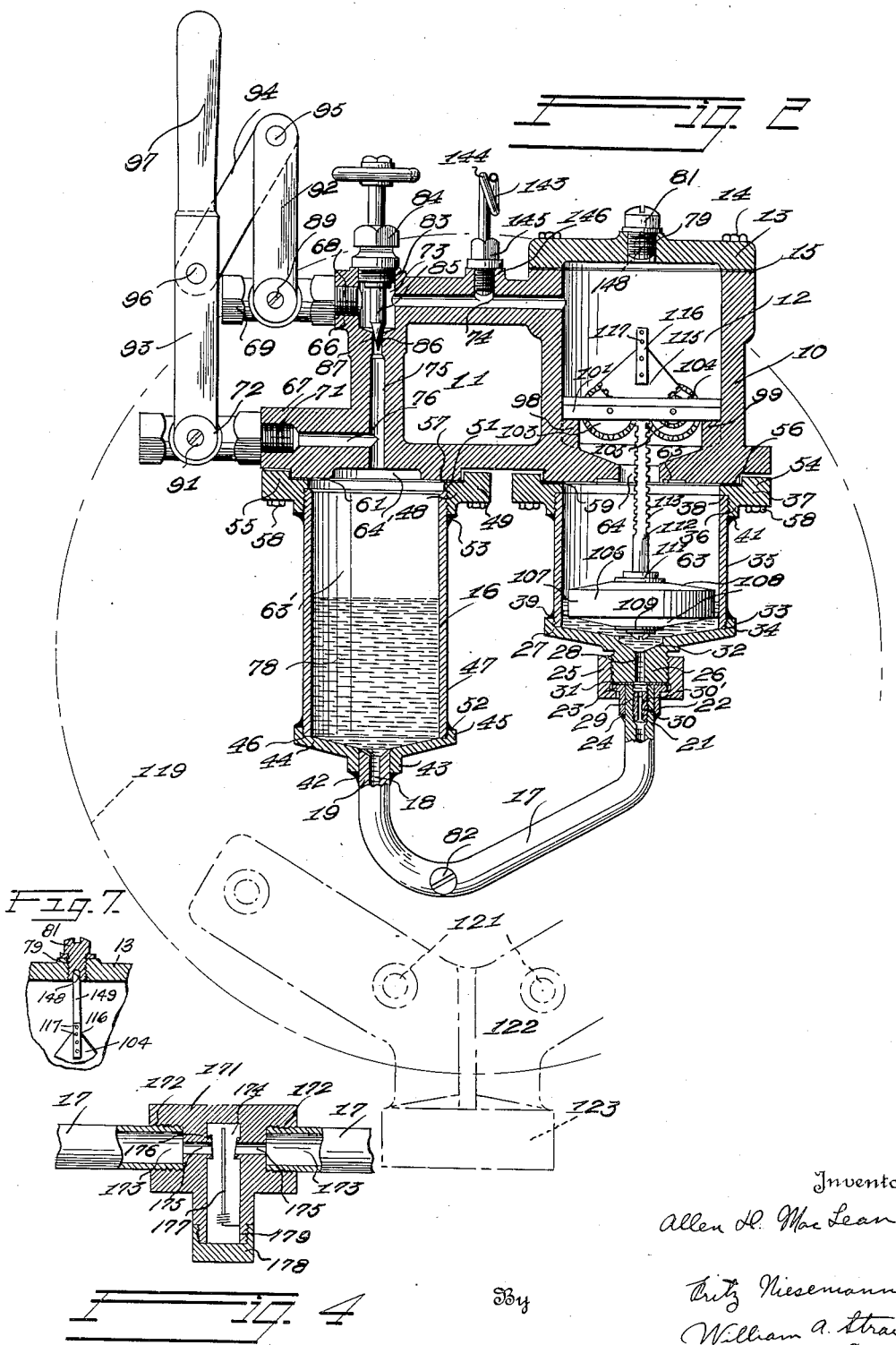

1,897,174

UNITED STATES PATENT OFFICE

ALLEN D. MacLEAN, OF WILKINSBURG, AND FRITZ NIESEMANN, OF PITTSBURGH, PENNSYLVANIA, ASSIGNORS TO PITTSBURGH EQUITABLE METER COMPANY, OF PITTSBURGH, PENNSYLVANIA, A CORPORATION OF PENNSYLVANIA

ORIFICE METER

Application filed July 14, 1928. Serial No. 292,819.

The present invention relates to a recording meter designed to indicate the flow of fluid through a conduit. More specifically the invention relates to a flow meter of the type that records the variations in differential pressure across an orifice or restriction in the conduit, and at the same time records the static pressure existing in said conduit on the same chart. From the recorded static and differential pressures the quantity of flow through the conduit may be readily computed.

The primary object of the invention is to provide a device of the character just stated, which is simply constructed, durable, effective and reliable in operation, and that is designed so that it may be readily adapted to varying operating conditions and that will give a reading of the pen, that records the differential pressure, that is directly proportional to the rate of flow of fluid through the conduit so that the reading of the differential pen may be more readily understood and interpreted by the user.

It is a further object of the invention to provide a recording meter of the above type in which the mercury column constituting a part of the manometer cannot be inadvertently blown out of the chambers provided for its reception either due to the inadvertent application of the entire available static pressure to one leg of the column or due to extraordinary variations in pressure across the orifice such as may arise under exceptional operating conditions.

A still further object of the invention is to provide a recording meter embodying mechanism designed to damp out vibrations or oscillations of the mercury column due to sudden changes in pressure so that the record made of the fluctuations in pressure will accurately represent such fluctuations without recording oscillations due to the momentum of the column.

A still further object of the invention is to provide a recording meter including a manometer that is of an extremely simple construction, that may be removed as a unit from the casing that supports the recording mechanism and to which the connections to the conduit are attached, whereby said manometer may be removed without disturbing the connections of the apparatus to the conduit and whereby a manometer having different operating characteristics may be readily applied to the apparatus in accordance with the characteristics of the fluid being measured, and of the characteristics of the restriction with which the instrument is to be used.

A still further object of the invention is to provide a recording meter of the type that records the flow through the conduit by measuring the variations of pressure across a restriction or orifice in said conduit including a manometer, the legs of which are subjected to the pressure at opposite sides of said orifice or restriction and in which the cross sectional area of the one of the legs of the manometer varies lengthwise of said leg so that the column will move in direct proportion to the rate of flow across said restriction or orifice though the differential pressure varies as the square of the velocity of flow.

A further object of the invention is to provide a recording meter in which the recorder is actuated by variations in differential pressure across an orifice or restriction in which valve means are provided in the mercury column that is subject to the differential pressure that will effectively prevent the sudden rush of mercury in either direction without substantially interfering with the accuracy of the record.

A further object of the invention is to provide a recording meter including a mercury column arranged to respond to variations in differential pressure and a float controlled by the movements of said column in which the float is provided with valves designed to prevent the escape of mercury from the manometer portion of the instrument in both directions.

A still further object of the invention is to provide a recording meter operated by a float controlled by a mercury column in which the float actuates a pair of gears in opposite directions, said gears being so disposed that either gear may alternately be utilized by an extremely simple change of a third gear to control the movement of a recording pen operating so that it may move in opposite directions from base lines relatively widely spaced apart on the chart, as may be most convenient.

A still further object of the invention is to provide a recording meter including a manometer tube of the U-type in which one the legs of the U is normally subjected to the presence existing on one side of an orifice or restriction in a conduit and in which the other leg of the manometer is subjected to pressure existing at the other side of said restriction or orifice and including means to insure the simultaneous initial application of pressure to both legs of said manometer so that the mercury cannot be blown out of the instrument by the inadvertent application of pressure from one side of said orifice or resriction to only one leg of the manometer in advance of the application of the pressure existing at the other side of the restriction to the other leg of the manometer.

With the above objects in view as well as others that will become apparent from the following disclosure, reference will be had to the accompanying drawings forming a part thereof, and in which:—

Figure 1 is a side elevational view of an orifice meter involving our invention, partly broken away and partly in section.

Figure 2 is a vertical sectional view taken substantially on a plane represented by line 2—2 in Fig. 1 with parts shown in elevation and the case and support therefor shown in outline by dot and dash lines.

Figure 3 is a vertical sectional view, partly in side elevation showing a modification of one of the chambers of the meter, which in assembled relation to the other parts of the meter shown in Fig. 1 forms the preferred embodiment of my invention.

Figure 4 is a longitudinal sectional view through an automatic check valve mechanism that may be applied to the tube connecting the two mercury chambers to prevent sudden surges of mercury in either direction.

Figure 5 is a view similar to Fig. 4 disclosing a modified form thereof.

Figure 6 is a similar view of a still further modified form of valve, and Figure 7 is a broken sketch showing the shipping rod in position.

Referring to the drawings by reference characters in which like characters designate like parts, 10 designates a casting which, as indicated, is hollow at 11 for the sake of lightness and the conservation of material and is provided with a cylindrical opening defining a low pressure chamber 12. Said chamber is closed at the top thereof by a cap 13 detachably secured thereto by suitable cap screws 14, a gasket 15 being clamped between cap 13 and casting 10 to provide a fluid-tight joint.

Detachably secured to the under face of casting 10 is a structure 16 constituting in effect, a manometer of U form and comprising a curved tube 17 provided with a bore 18 and having the opposite ends 19 and 21 thereof disposed in parallel relation, with end 21 preferably higher than end 19 when in assembled position. Engaged with end 21 of tube 17 is a collar 22 provided with a laterally projecting flange 23 at the outer end thereof, collar 22 being welded to tube 17 adjacent the inner end thereof as indicated at 24. Swivelly connected with flange 23 is an internally threaded coupling 25 for detachable engagement with an inwardly directed externally threaded boss 26, of a conical cap 27. Boss 26 is provided with a bore 28 communicating with an internally threaded bore enlargement 29 in end 21 of tube 17. An externally threaded plug 30 provided with a restricted bore 30' is threadedly engaged in enlargement 29 for a purpose later described. A suitable gasket 31 is interposed between sleeve 22 and boss 26 said gasket being tightly clamped therebetween upon drawing up coupling 25 to provide a fluid-tight joint.

Cap 27 adjacent the inner end of boss 26 in alinement with bore 28 is provided with a valve seat 32 and is further provided with an internally threaded circumferential flange 33 defining with the body of cap 27 a shoulder 34. Seated on shoulder 34 and engaged with threaded flange 33 is the inner externally threaded end of a cylinder 35 whose outer end is externally threaded for engagement with an internally threaded flange 36 of a collar 37 serving to connect said cylinder to casting 10. Said collar is provided with a shoulder 38 engaging the outer end of cylinder 35. Cylinder 35 after being assembled as above defined is preferably welded to cap 27 as at 39 and to collar 37 as at 41 thus providing a rigid and leak proof construction. Cylinder 35 forms an enlargement in one leg of the manometer.

Surrounding end 19 of tube 17 and welded thereto as at 42 is the inwardly directed flange 43 of a conical cap 44 provided with an outwardly directed internally threaded flange 45 and a shoulder, 46. A cylinder 47 forming an enlargement for the other leg of the manometer has an inner externally threaded end seated on shoulder 46 and engaged with threaded flange 45. Secured to the outer threaded end of cylinder 47 is the internally threaded flange 48 of a collar 49 serving to connect said cylinder to casting 10. Said collar is provided with a shoulder 51 for engagement of the outer threaded end of cylinder 47.

After being assembled as above defined cylinder 47 is preferably welded to flange 45 at 52 and to flange 48 at 53 thus providing a rigid and leak proof construction.

Collars 37 and 49 are respectively provided with flanges 54 and 55 for engagement about respective securing and locating projections 56 and 57 of casting 10. The entire assemblage above described is detachably secured to casting 10 by means of stud bolts 58 extended through collars 37 and 49 and engaged with casting 10, suitable gaskets 59 and 61 being tightly clamped between casting 10 and the respective collars 37 and 49 to provide fluid tight joints.

As indicated in Fig. 1 casting 10 is provided with internally threaded bosses 62 for the reception of suitable anchoring means of any approved type.

The structure 16 assembled with casting 10 as shown provides a float chamber 63 defined by cylinder 35, cap 27 and adjacent portion of casting 10. A port 64 extends from said chamber establishing communication between low pressure chamber 12 and float chamber 63, casting 10 adjacent port 64 being provided with a valve seat 65 for the reception of a valve hereinafter described, for controlling said port. The structure further provides a calibrating chamber 63' defined by cylinder 47, cap 44 and adjacent portion of casting 10, which portion of casting 10 is provided with a recess 64' in communication with one side of the orifice as hereinafter described. Casting 10 is provided with an upper internally threaded boss 66 and a lower internally threaded boss 67 projecting laterally therefrom and threadedly engaged with boss 66 is a threaded end 68 of a ported connector 69 and threadedly engaged with boss 67 is a threaded end 71 of a ported connector 72. Connectors 69 and 72 respectively are adapted for connection with pipes leading from the low and high pressure sides of the orifice plate, Venturi or similar restriction in the fluid line in well-known manner.

Casting 10 is provided with a chamber 73 adjacent end 68 of connector 69 which chamber is in communication with low pressure chamber 12 through a port 74 and with recess 64' and chamber 63' through a port 75. A port 76 puts port 75 into communication with connector 72. Chambers 63 and 63' with tube 17 connected therewith contain a column of mercury 78. Cap 13 is provided with a tapped opening 79 for the admission of the mercury, opening 79 being normally closed by a screw plug 81.

A valve 82 is provided in tube 17 at the lowest point thereof as illustrated for draining the mercury when desired or necessary. The construction disclosed in either of Figs. 4, 5, and 6, and hereinafter described may be inserted in tube 17 in lieu of valve 82. Chamber 73 is provided with a threaded bore 83 for the detachable reception of a screw plug 84 having adjustably journaled therein a needle valve 85 for cooperation with a valve seat 86 provided by a constriction 87 between chamber 73 and port 75. Connectors 69 and 72 are respectively provided with valves 89 and 91 secured by screws or equivalent means to levers 92 and 93. Said levers are pivotally connected together by means of a link 94 pivoted at its opposite ends to links 92 and 93, by pivots 95 and 96 respectively. Link 93 is provided with an actuating handle 97 upon movement of which valves controlling the ports in connectors 69 and 72 are simultaneously operated thus admitting fluid pressure simultaneously into ports 74 and 76.

Casting 10 defining the wall of chamber 12 is provided with integral projections 98 and 99 which support the opposite ends of bearing bars 101 and 102 in transversely spaced relation. Between said bars are supported gear wheels 103 and 104 whose shafts are rotatably journaled in bars 101 and 102, and which are slightly spaced apart as indicated in Fig. 2. A pinion 105 may be mounted on the shaft to which either of gears 103 or 104 are secured. Gears 103 and 104 are rotated in opposite directions as hereinafter described, and pinion 105 is secured for movement as a unit with either of said gears depending upon the direction of rotation desired as and for a purpose hereinafter described.

Mounted in chamber 63, buoyantly supported on mercury, column 78, is a float 106 which as shown is provided with a cylindrical body portion 107 and conical end portions 108 to which are secured valves 109 and 111 for cooperation with seats 32 and 65 respectively. Secured to float 106 is the inner end of a rack bar 112 provided with teeth 113 on opposite sides thereof in meshing engagement with the teeth of gear wheels 103 and 104, and serving to rotate said wheels in opposite directions, as above stated, to impart rotation in either direction to pinion 105 depending upon whether said pinion is mounted for movement with wheel 103 or with wheel 104. Meshing with pinion 105 is a segmental gear 115 to which is secured a bar 116 in turn secured to differential pen shaft 117 for imparting rotation thereto upon movement of segmental gear 115 due to movements of float 106 in response to changes in differential pressure.

It will be observed that the segmental gear 115 is mounted for rotation about a horizontal axis that passes centrally longitudinally through the rack 112 and that the radius of said gear is such that the teeth thereon are in position to engage the pinion 105 without regard to whether said pinion is secured to the shaft that rotates as a unit with gear wheel 103 or to the shaft that rotates as a unit with gear wheel 104. This construction permits operation of the pen shaft 117 in either direction by simply shifting the gear 105 so that it is secured to the gear wheel that rotates in the desired direction. No other changes in the mechanism are required in order to reverse the rotation of said pinion shaft. Accordingly, when it is desired for convenient computation of the charts that the differential pressures be recorded from a base line located at the outer edge of the chart the pinion 105 is secured to the gear 103 or 104 that will cause the pen to move inward from the edge of the chart in response to increment in differential pressure. When, in order to facilitate computation of the charts it is desirable that a base line be selected that is disposed substantially inwardly from the edge of the chart and that the pen move outward from said base line toward the edge of the chart the pinion 105 is shifted to the other of the wheels 103 or 104 in order to provide the desired direction of movement of the pen. This arrangement provides an extremely simple adjustment whereby the range of usefulness of the apparatus is greatly enhanced because by a single shifting of a single gear the apparatus may be adapted to efficiently serve its purpose by recording the differential pressures with respect to a base line, however located, that will facilitate the computation of the recording results.

Detachably secured to casting 10 by means of cap screws 118 is a gauge case 119 which is of cylindrical formation provided with a crystal supporting door of usual form. Secured to the back of case 119 by securing means 121 is a bracket 122 provided with a cylindrical base 123 having a threaded bore 124 for detachable connection with a suitable threaded supporting pipe or standard.

Threadedly engaged in an internally threaded boss 125 of casting 10 is a differential shaft stuffing box 126 which extends through a supporting plate 126' in case 119 and in which shaft 117 is journaled in a central longitudinal bore 127 of greater diameter than shaft 117, providing an annular space for the reception and retention of grease which is admitted thereto through an opening 128 in box 126 normally closed by a screw plug 129. One end of bore 127 is closed by means of a shaft bearing 131 and a nut 132 engages the opposite end of box 126 confining a packing 133.

Suitably supported in case 119 is a clock mechanism 135 which drives a chart supporting dial 136 through a shaft 137 in well-known manner. Secured to shaft 117 for movement thereby is a differential pen 138. Rotatably supported on shaft 117 adjacent pen 138 is a static pen 139. Pens 138 and 139 are provided with suitable indicating points for inking on the moving charts for producing the records thereon. Static pen 139 is provided with an angular extension 141 which is secured to a helical tube 142 arranged around box 126. The interior of tube 142 is in communication with port 74 through a tube 143 to which it is secured. Said tube is provided with a coil 144 and is in communication with port 74 through plug 145 threadedly engaged with an apertured internally threaded boss 146 on casting 10 adjacent port 74.

In operation of the construction so far disclosed the meter is suitably supported through bracket 122 and, if necessary, by means of bosses 62, from the gas line adjacent the orifice plate or similar restriction provided therein in usual manner. Connectors 69 and 72 are connected by suitable pipes to the respective low and high pressure sides of the orifice plate or restriction in the gas line.

Mercury is supplied to chambers 63 and 63' and connecting tube 17 through opening 79 in sufficient quantity such that float 106 will be held out of engagement with cap 27 and valve 109 unseated when chambers 63 and 63' are both under equal or atmospheric pressure. When assembling, valves 89 and 91 are closed and prior to opening valves 89 and 91 needle valve 85 is unseated putting chamber 73 and port 75 in communication to prevent a sudden pressure rise in either chamber 63 or 63' from blowing the mercury out of the manometer.

However, if either chamber 63 or 63' should be accidentally subjected to a pressure largely in excess of that for which the apparatus is designed the valves 109 and 111 carried by the float 106 would be caused to seat on their seats 32 and 65 respectively. Said valves will accordingly, effectively prevent the inadvertent ejection of the mercury contained in the manometer. The restriction 30' serves further to steady the operation of the recording pen, since it serves to damp out minor vibrations in the column of mercury caused by a relatively rapid change in the rate of flow through the restriction that would tend to cause oscillation of the mercury column, if the column were free to oscillate. The vibration of the mercury column is, accordingly, effectively prevented without substantially interfering with the accuracy of the instrument. After valves, 89 and 91 have been simultaneously opened by manipulating handle 97 and pressure built up in chambers 63 and 63' which up to this point is equal in both chambers, valve 85 is closed, putting chambers 63 and 63' respectively in communication with low and high pressure, connectors 69 and 72 thus permitting the unequal pressures to gradually build up in chambers 63 and 63' to avoid forcing the mercury out of either chamber which might occur if unequal pressures were suddenly developed in the chambers. The chambers 63 and 63' being now in communication with the down and up or low and high pressure sides of the orifice plate or similar restriction the difference in pressures or the drop across the orifice plate or restriction will be indicated by a difference in the level of the mercury in chambers 63 and 63'. As chamber 63' is the high pressure chamber the mercury in chamber 63 will rise as the pressure difference increases and as a result float 106 will be buoyed up. Said float, through toothed rack bar 112, will rotate gears 103 and 104 and consequently pinion 105 which, being in mesh with segmental gear 115, will impart movement thereto and to shaft 117. Shaft 117 in turn will move pen 138 over the gauge chart. At the same time the static pressure on the down side of the orifice plate will be indicated by pen 139 operated through expansion and contraction of helical tube 142 as the pressure rises and falls respectively in the line on the down or low pressure side.

For the shipment or transportation of the meters, plug 81 may be provided with a bore 148 for the reception of the outer end of a readily removable rod 149, said rod being in bearing engagement with bar 112 to prevent movement thereof as well as parts associated therewith.

In the form of the invention so far disclosed the differential pressure is recorded on a chart by the mechanism described due to the movement of the column of mercury 78, the differential in level of which in chambers 63 and 63' varies in accordance with the variation in differential pressure. The quantity of gas passing through the orifice plate or restriction is computed from the differential and static pressures recorded on said chart. In order to facilitate such computation it is desirable to have the pen controlled by the differential pressure move in direct proportion to the velocity of flow. The differential pressure is however proportional to the square of the velocity of the gas through a restriction. As a consequence the range of mercury in chamber 63 is not directly proportional to the gas flow when a calibrating chamber of uniform cross section as illustrated in Fig. 2 is employed.

In order that the recording pen may move in direct proportion to the velocity of flow of the fluid the invention embodies a calibrating chamber wherein the cross sectional area thereof varies throughout the length thereof and which, as illustrated in Fig. 3 comprises a cylinder 151 the outer end of which is secured to collar 49 in the manner above set forth and which at its lower end is threadedly engaged with an internally threaded flange 152 of an approximately conical coupling 153. Cylinder 151 is welded to flange 152 as indicated at 154 to provide a fluid tight joint. Coupling 153 at the inner end thereof is provided with an internally threaded flange 155 and a shoulder 156 against which rests the upper end of a cylinder 157 which end is threadedly engaged with flange 155 and welded thereto at 158 for providing a fluid tight joint. The lower end of cylinder 157 is threadedly engaged with an internally threaded flange 159, of a conical cap 161 and resting upon a shoulder 162 thereof, weld metal 163 being applied to cylinder 157 and flange 159. Cap 161 has secured thereto tube 17 in the manner above set forth and which is provided at the opposite end thereof with the coupling 25 for detachable engagement with conical cap 27 in the manner above set forth, tube 17, it will be noted in this form of the invention has a greater vertical extent than in the form illustrated in Fig. 2 for reasons hereinafter stated.

Detachably secured in a threaded recess 164 in cap 161 is the inner threaded end of a compensator 165 which at the inner end thereof is provided with outwardly diverging ports 166 which at their inner ends communicate with a conical recess 167 which in turn is in communication with the bore of tube 17.

It will accordingly be seen that a construction is provided wherein the cross sectional area of the calibrating chamber decreased from the outer to the inner end thereof in order to compensate for the pressures, which normally are proportional to the square of the velocity of the gas passing through the orifice plate. The range of variations in the area of the mercury columns is such that the float in chamber 63 will move in direct proportion to the velocity or flow of gas. Thus the recording pen gives a reading that is more easily interpreted without computation and at the same time gives a correct indication of the gas passed on the recording chart.

The walls defining the calibrating chamber will be shaped so that the flow between the communicating chamber is accurately proportioned so that the range of mercury in chamber 63 will be directly proportional to the flow of gas through the orifice plate instead of the square of the flow whereby a substantially accurate, easily read record of the quantity of gas passing the plate will be made on the chart.

The construction illustrated in Fig. 3 while fulfilling the above prerequisites is such that the capacity thereof can be readily varied by the substitution of various sized cylinders 151 and it is to be particularly noted that the varying cross-sectional areas of the calibrating chamber is provided for the major portion thereof by means of the removable compensating element 165 which being seated directly by screw-threading or like securement means over chamber 167 and provided with the ports 166 in communication therewith and this element with cylinder 157 prevents any sudden surges of mercury into cylinder 157 occasioned by a sudden differential of pressure whereby the mercury is prevented from being forced out of the chambers.

Calibrating chambers have heretofore been constructed comprising a cylinder of somewhat conical formation wherein the diameter thereof progressively decreased from one end to the other. Such constructions were difficult and expensive to make and furthermore it was difficult to obtain any substantial degree of accuracy in such constructions.

In accordance with our invention wherein the varying cross sectional configuration of the calibrating chamber is provided by a removable member whose external surface is curved makes the construction thereof much easier than is the case of a cylinder with a curved inner wall and consequently can be manufactured at less cost and can also be shaped to a greater degree of accuracy, it being highly important that the curved surface be accurately formed in order that the record of flow be substantially correct.

Alternative arrangements are provided against sudden surges of mercury through tube 17 from one chamber to the other. This invention contemplates the provision of automatic valve mechanism for connection in tube 17 one form of which is illustrated in Fig. 4. Such valves may be provided in the portion of tube 17 occupied by plug 82 in Fig. 2. As shown in this figure the arrangement comprises a casting 171 provided with oppositely positioned internally threaded bores 172 for detachable engagement with threaded ends 173 of sections of tube 17 intermediate the chamber engaging ends thereof. Casting 171 is provided with a central recess 174 which is in communication with bores 172 through ports 175 the adjacent or inner ends of which are surrounded by bosses 176 providing valve seats for an automatic operating valve in the form of a flat leaf spring 177 the inner end of which is secured to casting 171 adjacent the drain opening in said casting. Said spring is accessible through said opening upon removal of a cap 178 detachably secured to a threaded flange 179 on casting 171. As will be noted valve seats 176 are in planes intersecting at the point of attachment of spring 177 for providing an accurate engagement between spring 177 and either valve seat 176.

Upon a sudden rush of mercury tending to force it through tube 17 spring 177 will be impinged against one seat 176 or the other depending upon the direction of the pressure effectually closing the bore in tube 17 and preventing the passage of mercury therethrough.

A modification of this type of construction is disclosed in Fig. 5 wherein casing 171 has formed at the adjacent ends of ports 175 ball seats 181 for cooperation with a ball 182 carried by the outer end of a spring rod 183 whose inner end is secured to cap 178 closing a drain opening as indicated at 184.

In accordance with this form of the invention sudden surges of mercury through tube 17 from one chamber or the other will cause ball 182 to be forced into contact with one of the seats 181 depending upon the direction of any such sudden surge thus positively preventing the mercury from being forced out of either chamber.

In Fig. 6 is illustrated a still further embodiment of this type of valve mechanism wherein spring rod 183 extends through a transversely disposed bar 185 being secured thereto by oppositely positioned nuts 186, bar 185 being provided with conical valves 187 for cooperation with similarly formed seats 188 in casting 171 at the adjacent ends of ports 175.

In accordance with this form of the invention valves 187 move simultaneously with rod 183 and consequently the valves will begin to close upon any sudden surge of mercury and will completely close if the pressure and time of flow is sufficiently great.

From the foregoing detailed disclosure it will be seen that a meter construction is provided which is comparatively simple in construction, durable, and reliable in operation and which embodies novel structural features for overcoming the many objections heretofore recognized in structures of this character.

Having thus described certain specific embodiments of our invention which are to be considered as illustrative and not restrictive since we are at liberty to make such changes or alterations as fairly fall within the scope of the subjoined claims.

Accordingly what we claim and desire to secure by Letters Patent is:

1. In an orifice meter a pair of chambers; a tube connecting said chambers; pressure sensitive liquid columns in said chambers communicating through said tube; a detachable valve mechanism in said tube; said mechanism comprising a casting provided with a chamber; a detachable cap closing said chamber; there being ports in said casting in communication with said tube; valve seats at the adjacent ends of said ports; and valve means for automatic cooperation with said seats upon abnormal pressures of said columns.

2. The structure defined in claim 1 in which said valve means comprises a resilient bar having one end thereof secured to said casting and the opposite end thereof adapted to oscillate into engagement with one or the other of said valve seats upon abnormally rapid movement of said column.

3. The structure defined in claim 1 in which said valve means comprises a ball supported by said spring arm to control movement of said valve means toward and from said seats.

4. An orifice meter comprising a ported casting; a low pressure chamber in said casting; a float chamber detachably supported by said casting in communication and in alinement with said low pressure chamber; means detachably supported by said casting comprising a collar, a conical coupling, a cylinder having the opposite ends thereof secured to said collar and said coupling, a second cylinder having one end thereof secured to said coupling, a cap secured to the opposite end of said second cylinder, a tube having one end thereof secured to said cap, said end of said tube provided with a conical recess in communication with the bore thereof; a coupling member carried by the opposite end of said tube for detachable connection with said float chamber, a compensating member detachably supported in said cap, said compensating member having a surface configuration such that the chamber defined by said second cylinder and said compensating member will have successively diminishing transverse areas, and angularly disposed ports in the base of said compensating member communicating with said conical recess.

5. In a differential pressure meter, a high pressure chamber and a low pressure chamber connected by a U conduit, liquid in said chambers and conduit, a float in said low pressure chamber, a rack-bar carried by said float and having rack teeth on opposite sides thereof, gears on opposite sides of the rack bar in mesh with the teeth on said rack-bar and adapted to be rotated in opposite directions upon movement of said float, and indicator-operating means interchangeably operated with either of said gears.

6. The invention as defined in claim 5 wherein said indicator-operating means includes a pinion adapted to be operated by rotation of either of said gears and indicating means in operable engagement with and adapted to be operated by rotation of said pinion.

7. A device of the class described comprising a receptacle having a pressure sensitive liquid column; a float in said receptacle; an indicator; operative connections between said float and said indicator including a rack-bar carried by said float, two gear wheels supported in said receptacle in mesh with opposite sides of said rack-bar, a pinion adapted to be carried by either of said gear wheels, and a segmental gear centrally positioned between said gear wheels and adapted to mesh with said pinion in either position thereof, a shaft connected with said segmental gear, and a recorder carried by said shaft.

8. A differential pressure device comprising a low pressure chamber; a high pressure chamber; a conduit connecting said chambers and containing a liquid which is variably displaced by pressures in said chambers; a float in said low pressure chamber; an indicating means; means operatively connecting said indicating means with said float; said conduit being connected to an opening in the bottom of said high pressure chamber; and a compensating member in said high pressure chamber to cause the float to move in direct proportion to the rate of flow in a conduit, said member being screw-threaded into the bottom of said high pressure chamber to close the opening connecting with said conduit, and a restricted passageway through the bottom of said member.

9. In a differential pressure meter, a casing having a high pressure chamber, a low pressure chamber, a conduit connecting said chambers and containing a liquid which is variably displaced by pressures in said chambers; a float in said low pressure chamber; an indicator-operating rod projecting upwardly from said float; means for guiding said rod for movement longitudinally of itself; and means including a readily removable bar adapted to engage the upper end of said indicator-operating rod and the casing to prevent movement of said float and rod during shipment of said meter.

10. The invention as defined in claim 9 including a plug removably secured to said casing and having a recess, the upper end of said bar engaging said recess during shipment of said meter.

11. An orifice meter comprising a high pressure chamber and a low pressure chamber connected by a conduit, liquid in said chambers and conduit, a float in said low pressure chamber; a rack-bar carried by said float and having rack teeth on opposite sides thereof, gears supported on opposite sides of said rack-bar in mesh with the teeth on said rack-bar and adapted to be rotated in opposite directions by movements of said float, shafts supporting said gears, a pinion adapted to be supported on and driven by either of said shafts, an indicator including a shaft projecting into said low pressure chamber, and a segmental gear secured to said indicator shaft and meshing with said pinion in either position thereof, whereby said indicating shaft and indicator are moved in either direction in accordance with the position of said pinion.

In testimony whereof we affix our signatures.

ALLEN D. MacLEAN.
F. NIESEMANN.